United States Patent [19]

Steiner

[11] Patent Number: 4,801,384

[45] Date of Patent: Jan. 31, 1989

[54] PROCESS FOR THE REMOVAL OF ORGANIC CONTAMINANTS FROM SOILS AND SEDIMENTA

[76] Inventor: Werner Steiner, 216 Daniel Low Ter., New York, N.Y. 10301

[21] Appl. No.: 54,340

[22] Filed: May 26, 1987

[51] Int. Cl.$^4$ .......................................... B01D 11/04
[52] U.S. Cl. .................................... 210/634; 134/12; 134/25.1; 134/25.5; 134/42; 210/669; 210/772; 210/908; 210/909; 570/211
[58] Field of Search .............. 134/12, 25.1, 25.5, 134/42; 210/634, 747, 768, 772, 908, 909, 663, 669, 691; 570/211; 585/864

[56] References Cited

U.S. PATENT DOCUMENTS

| | | | |
|---|---|---|---|
| 4,144,162 | 3/1979 | Edger et al. | 208/13 |
| 4,326,090 | 4/1982 | Smith et al. | 210/757 |
| 4,334,102 | 6/1982 | Decker et al. | 210/634 |
| 4,351,718 | 9/1982 | Brunelle | 208/262 |
| 4,400,552 | 8/1983 | Pytlewski | 568/715 |
| 4,405,448 | 9/1983 | Googin et al. | 210/909 |
| 4,417,977 | 11/1983 | Pytlewski et al. | 208/262 |
| 4,421,649 | 12/1983 | Giskehaug et al. | 210/909 |
| 4,422,940 | 12/1983 | Cousino et al. | 210/631 |
| 4,430,208 | 2/1984 | Pytlewski et al. | 208/262 |
| 4,464,351 | 8/1984 | Vasak et al. | 423/486 |
| 4,477,354 | 10/1984 | Fessler et al. | 210/634 |
| 4,483,716 | 11/1984 | Heller | 134/7 |
| 4,501,446 | 2/1985 | Glaser et al. | 210/747 |
| 4,532,028 | 7/1985 | Peterson | 208/262 |
| 4,549,966 | 10/1985 | Beall | 210/661 |
| 4,574,013 | 3/1986 | Peterson | 134/2 |
| 4,595,509 | 6/1986 | Fox et al. | 210/909 |
| 4,606,774 | 8/1986 | Morris | 134/12 |
| 4,662,948 | 5/1987 | Weitzman | 210/909 |

FOREIGN PATENT DOCUMENTS 1517685  4/1972  Fed. Rep. of Germany ...... 210/909

Primary Examiner—Peter Hruskoci
Attorney, Agent, or Firm—Sprung Horn Kramer & Woods

[57] ABSTRACT

A process for the decontamination of materials such as soil, sediments and sludges contaminated with organic contaminants such as PCB's. The process comprises the steps of separating the material into a solid fraction and a liquid fraction when liquid is present leaching the solid fraction with a leaching solvent to obtain contaminated leaching solvent and a mixture of decontaminated solids and leaching solvent and stripping the contaminant, from the contaminated leaching solvent with a stripping solvent to concentrate the contaminants. When liquid is present in the material adsorbing residual contaminants from the liquid fraction are adsorbed onto decontaminated solids to produce decontaminated liquids and contaminated solids.

22 Claims, 1 Drawing Sheet

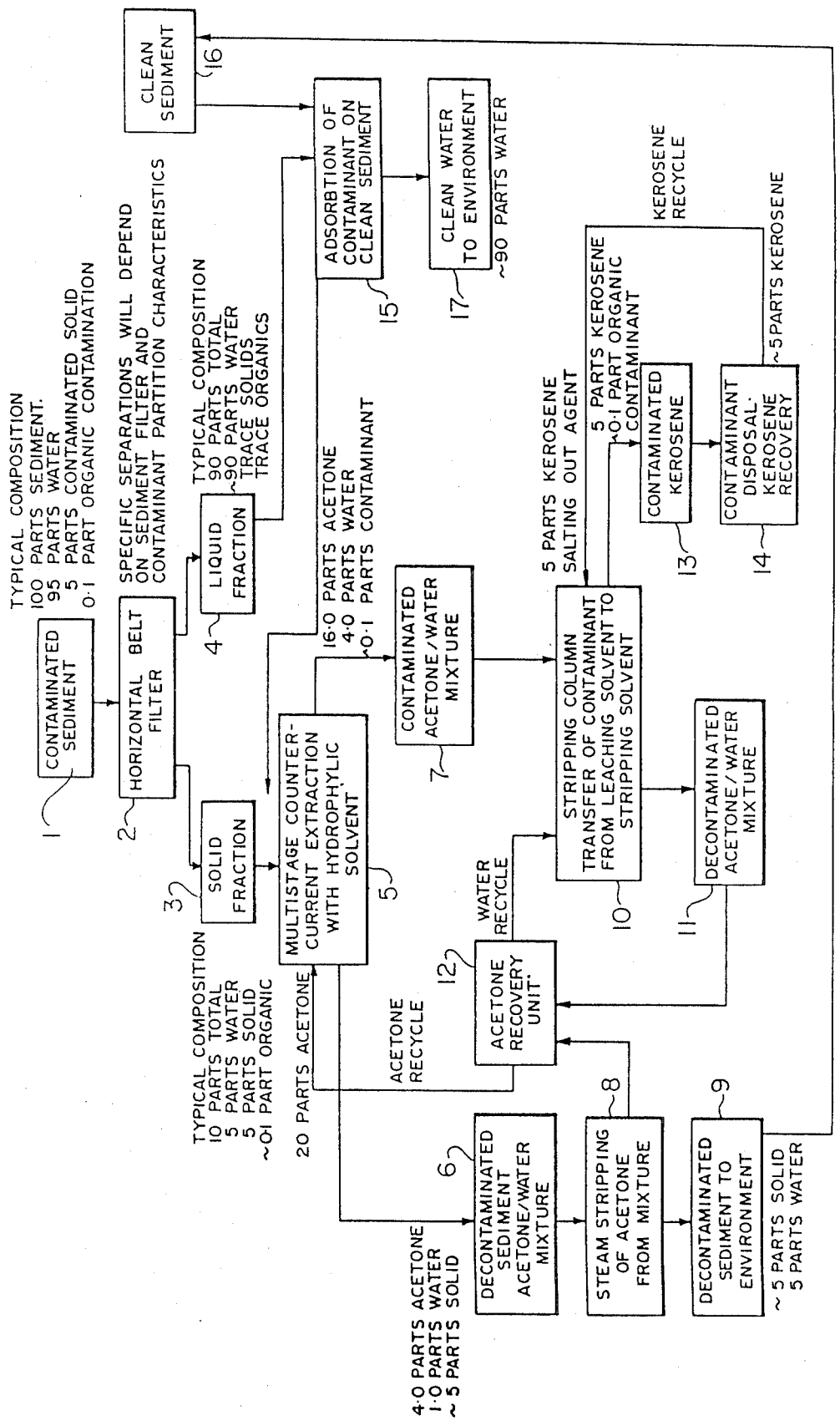

PROCESS FOR THE REMOVAL OF ORGANIC CONTAMINANTS FROM SOILS AND SEDIMENTA

The U.S. Government has rights in this invention pursuant to Contract No. CR-812123-01-0 between the U.S. Environmental Protection Agency and New York University.

BACKGROUND OF THE INVENTION

The present invention is directed to the process for the removal of organic contaminants, in particular polychlorinated biphenyls (PCBs), from soil, sediments and sludges. All organic compounds having physico-chemical characteristics similar to PCBs can be removed by this process.

Contamination of sediments and sludges of various harbors, rivers and lagoons throughout the U.S. with PCBs and other organics is recognized to be a serious environmental problem. Specific PCB contamination sites of particular severity have been identified at Waukegan, IL. and Bedford Harbor, ME., the Hudson river in New York and numerous industrial lagoons. Dredging to decontaminate such harbors/rivers and lagoons is unacceptable until effective disposal/treatment methods for the contaminated sediments become available. The detoxification of such contaminated sediments and sludges at economically acceptable costs presents a serious technological challenge if goals of having no more than 1-5 ppm PCBs in the treated sediments are to be met.

A major problem in the decontamination of soil, sediment and sludges is the high water content often encountered in the environment. This is particularly true if the sediment or sludge has to be dredged from a river basis or a lagoon. Water contents of 80% are not uncommon.

Treatment of PCB contaminated sediments and sludges in an incinerator complying with CFR761.70 is quite energy intensive and costly, if 99.9999 percent destruction and removal efficiencies for the PCBs are to be achieved. Exact costs are difficult to predict because it is uncertain what prices commercial incineration facilities will charge to accept the responsibility of handling such sensitive materials. Current estimates range from $1700 to $2000/m$^3$ if the cost of disposal of residue from incineration are included. Chemical waste landfill disposal costs incurred when the contaminated sediments or sludges are placed in an authorized chemical waste landfill, are less expensive, but present other difficult problems. There exists therefore a very real need for an alternative process technology which is both technically and economically feasible for the cleanup of these PCB contaminated sediments and sludges.

SUMMARY OF THE INVENTION

The main object of the present invention is to provide a process which satisfies the need for cleaning contaminated soil, sediments and sludges and which is both technically and economically feasible.

These and other objects of the present invention are achieved in accordance with the present invention with the process for the decontamination of soil, sediments and sludges contaminated with PCBs and organic compounds having physico-chemical characteristics similar to PCBs, such as pesticides, herbicides, polyhalogenated benzenes, polychlorinated phenols, dioxins, and polynuclear aromatic hydrocarbons which are soluble in acetone or in another low boiling (bp. <100° C.) hydrophilic solvents.

The process in accordance with the present invention is based upon known facts about the properties of PCBs present in soils; sediments and sludges, that is, that the PCBs have a very high partition coefficient between natural sediments and water. The PCB concentration in sediments is on the order of 1000 to 3000 times higher than that in water in the same mixture. The present invention also utilizes the characteristics of particular hydrophilic and hydrophobic solvents, and the application of stripping operations as a final step for isolation and concentration of the contaminants.

The first step of the process takes advantage of the extremely low solubility of PCBs in water and the high affinity for sediment particles. In a typical PCB contaminated sludge or sediment composed primarily of water with, for example, 20% total solids, one could expect virtually all of the PCBs to be associated with the sediment in a water medium. Thus the first processing step is a physical separation of water and solids. This can be accomplished with varying degrees of efficiency using existing equipment. In practice, the solids fraction from this separation will contain on the order of 50% water, but will most likely contain 98%+ of the PCB content. The solid fraction and the liquid fraction from the first step require further treatment, however, the first step has managed to isolate most of the PCBs and reduced the sample size by about 60%. The water fraction requires subsequent treatment, which will be addressed later.

This step of the process is applicable to soil, sediment or sludges having a water content from 20% up to 95%, and will be successful with any organic contaminant, which has a partition coefficient (K) between the solid and the liquid fraction of at least 20, whereby the partition coefficient is defined as the ratio of the contaminant concentration in the solid fraction to that in the liquid fraction.

In the second step of the process, the PCB must disassociate themselves from the solid substrate. To do this a water miscible solvent (hydrophilic) such as acetone, is added in quantities sufficient to break the bond between the PCBs and the solid surface. This is followed by another liquid/solid separation. This description is for one stage of the proposed second step of the process.

The use of a hydrophilic solvent was made possible by the removal of the bulk of the water in the first step. The amount of PCB transferred to the solvent/water mixture depends on the stage efficiency, which in turn depends on the partition coefficient between the solid phase and the leaching solvent and the mass ratio of solvent to solids. For optimal performance the mass ratio of solvent to solids should have a value in the range of 1 to 15, preferably 1 to 10 and most preferably 4 to 7.

Knowing the stage efficiency, one can then predict the number of stages required to perform a particular level of separation, given the original contamination level and the allowable level in the solid effluent. This second step is a multistage counter-current leaching using a hydrophilic solvent, or a mixture of two or several solvents from the family of solvents which have the following characteristics:

The hydrophilic solvent must be completely miscible with water and should have a boiling point in the range of 40° C. to 95° C. at atmospheric pressure. If the solvent forms an azeotropic mixture with water then the azeotrope should have a water content of less than 30%. The solvent—even when it contains up to 20% water—should allow for a reasonably fast settling rate of the solids to be treated. The settling rate (as defined in Tryebal, pp. 639, 2nd ed., 1968) measured in a cylindrical tube (35 mm wide, 250 mm high) should be equal or higher than 7 mm/min for a slurry concentration (mass of solid/volume of slurry) in the range of 150 to 420 g/l. Examples of such solvents are: acetone, methanol, ethanol, isopropanol; the preferred solvent is acetone. This part of the process would be similar for any organic contaminant, which is soluble in the organic leaching solvent and has a partition coefficient between the solid fraction and the leaching solvent with a value smaller than 5, preferably smaller than 2.

Variations may be required for mixed systems and in particular contaminants with a higher solubility in water than PCB. Once again, the key to the process is the understanding of the importance of partition coefficients. In mixed systems, partitioning can be expected to be a function of how the contaminants interact relative to each other in the presence of water, solvents and the solid fraction.

The products from the second step are: (1) a hydrophilic solvent/water mixture containing nearly all of the PCB contamination which requires further treatment and (2) a PCB free soil/solvent mixture from which the solvent must be recovered and returned to the process cycle with the soil now being decontaminated and ready to be returned to the environment. A small fraction of this clean soil is utilized in an absorption column to extract the trace amounts of PCBs from the water effluent of the first step. An analagous situation would exist were the contaminant something other than PCB.

The third step of the process is a stripping operation in which the PCB containing stream from above is contacted in a liquid-liquid extractor with an hydrophobic solvent and an aqueous salt solution.

The stripping operation is facilitated by adding excess amounts of aqueous salt solution. The salt concentration in the solvent-water mixture can be in the range of 0% to 100% of the saturation value, preferably 50 to 90%, whereby the salt can be any mineral salt with the preferred salt being potassium sulfate. The water to solvent ratio should be in the range of 1 to 10, preferably 1 to 5 and most preferably 1 to 3.5. The addition of an aqueous salt solution reduces the solubility of PCB in the solvent-water mixture from step 2, and thus increases the stage efficiency of the stripping operation.

The hydrophobic solvent should be imiscible with the hydrophilic solvent-water mixture, should have a density of less than 0.9 g/ml, should have a high solubility for the organic contaminant, and when agitated should not emulsify with the hydrophilic solvent-water mixture. The hydrophobic solvent should be selected so that the partition coefficient of the organic contaminant between the hydrophobic and the hydrophilic solvent is equal or greater than 3, preferably greater than 10, and most preferably greater or equal to 20 for the entire range of the ratio of water to hydrophilic solvent. For a given choice of hydrophilic and hydrophobic solvents, this step of the process can be used successfully for any organic contaminant having a partition coefficient, of at least 3, preferably greater than or equal to 10 and most preferably greater than or equal to 20 defined as the ratio of the concentration of the contaminant in the hydrophobic solvent to that in the hydrophilic solvent.

This step is required to separate the PCBs from the aqueous phase which is inconvenient for the final destruction step and also, one can concentrate the PCBs in this step further reducing the volume of contaminated sample required for handling.

The desired volume reduction of the contaminated sample in this step can be achieved by the proper choice of the ratio of leaching to stripping solvent, which should be in the range of 1 to 10, and the appropriate addition of aqueous salt solution. This method of concentrating the contaminated sample has two important advantages. It requires very little energy and because no evaporation of solvent is involved the choice of the hydrophobic solvent is not restricted by vapor pressure considerations. The hydrophobic solvent is one from the family of solvents of the methane series with 6 to 16 carbon atoms per molecule, preferably kerosene and toluene, with kerosene being the most preferred solvent.

The two streams which leave this step are the PCB concentrated in stripping solvent which proceeds to final destruction either by chemical means (KPEG Reagent) or by incineration and the hydrophilic solvent/water mixture containing trace PCBs. The solvent/water mixture goes next to a distillation column in which the solvent is released and returned to the leaching process described in the second step. The aqueous salt solution contaminated with trace amounts of PCB leaving the distillation column is recycled to the front of the stripping process. In this process step, the organic contaminant is concentrated from the hydrophilic to the hydrophobic via a multi-stage stripping operation. Once again, this approach has general applicability, if a clear understanding of the partitioning characteristics of the contaminants are known.

The fourth step of the process is an adsorbtion operation in which the water fraction from the first step is decontaminated by adsorbing the organic contaminant such as PCB on the surface of a portion of cleaned sediment obtained in step 2. The water is contacted with the cleaned sediment and then separated from the now contaminated sediment. This can be a multistage step with this fourth step repeated for each stage. The actual amount of cleaned sediment required in this step depends on the partition coefficient of the contaminant between the solid and the water fraction, the number of stages, and on the desired level of decontamination. The product streams leaving the fourth step are:

(1) contaminated sediment which is returned to the leaching step where it is combined with new untreated sediment from step 1, and (2) decontaminated water, which is ready to be returned to the environment. This step of the process will work successfully with any organic contaminant having a partition coefficient between the solid fraction (soil, sediment and associated materials) and the liquid fraction with a value of equal to or greater than 20, preferably greater than 100 and most preferably greater than 1000.

The advantages of the process in accordance with the present invention are:

exceptionally high recovery of PCBs from contaminated solids, sediments and sludges;

to obtain fully cleaned sediment wherein there is complete removal of residual solvents as well as PCBs;

to obtain a solid and a water fraction which can safely be returned to the environment.

low energy requirements since no energy intensive steps are involved in the solvent extraction operation;

low raw material requirements since there is complete recycling of solvents.

These and other advantages and objects of the present invention will become clear from the following detailed description taken with the attached drawing, wherein:

BRIEF DESCRIPTION OF THE DRAWING

The FIGURE is a flow chart of the process in accordance with the present invention.

DETAILED DESCRIPTION OF THE INVENTION

In the process, contaminated sediment provided at 1 typically comprises 100 parts (by weight) sediment, including 95 parts contaminated water, 5 parts contaminated solids and 0.1 parts organic contamination. The sediment is fed to a horizontal belt filter at 2 wherein the original composition is broken up into a solid fraction typically containing a total of 10 parts including 5 parts water, 5 parts solid and approximately 0.1 parts organic and a liquid fraction 4 typically comprising 90 parts total weight of which approximately 90 parts is water and the remaining constituents comprising trace solids and trace organics.

The solid fraction is fed in step 5 to a multistage countercurrent extraction process with a hydrophilic solvent typically 10 parts of acetone from acetone recovery unit 12 for the 10 parts of solid fraction. As a result of this extraction, decontaminated sediment and acetone/water mixture are obtained at 6 including typically 4 parts of acetone and approximately 5 parts of solid and a contaminated acetone/water mixture is obtained at 7.

The decontaminated sediment and acetone water mixture is steam stripped of the acetone at 8 so that decontaminated sediment which is able to be released to the environment is obtained at 9 and contains approximately 5 parts of solid and 5 parts of water. The stripped acetone is fed to the acetone recovery unit 12 wherein acetone is separated from any remaining water, with acetone being recycled to the multistage countercurrent extraction unit 5 and the water recycled to a stripping column 10 to be described later.

The contaminated acetone water mixture from 7 is fed to stripping column 10 wherein the contaminant is transferred from the leaching solvent to a stripping solvent, in this instance kerosene. The decontaminated acetone water mixture from the stripping column 10 is received at 11 and acetone and water are separated from each other in the recovery unit 12.

The stripping column receives approximately 5 parts of kerosene for the total 20 parts of materials received from step 7. After the stripping is taking place and the contaminants are concentrated in the stripping solvent, the contaminated kerosene at 13 comprises 5 parts of kerosene and approximately 0.1 parts of organic contaminant. In a contaminant disposal kerosene recovery unit 14, the contaminant is separated from the kerosene so that the kerosene is recycled to the stripping column 10.

The liquid fraction 4 which only contains trace organic contaminants, is fed to 15 where clean sediment is provided so that the contaminant is adsorbed on the clean sediment. At 17 approximately 90 parts of clean water are obtained which can be released to the environment. The clean sediment for 15 can be obtained from clean sediment 16 which is in part recycled from the decontaminated sediment in step 9. Moreover, the contaminated sediment obtained from step 15 can be fed to the multiphase counter-current extraction process step 5 so as to decontaminate the sediment.

The initial separation of the liquid in solid fractions at 2 can be by either filtration, centrifugation or by means of a horizontal belt filter system.

The leaching process carried out at 5 can be carried out by the use of a mixer-settler type continuous countercurrent contactor. The liquid extraction carried out in the stripping column 10 can take place in an agitated extraction tower such as a rotating disk unit. The adsorbtion of the contaminant on clean sediment at 15 can be carried out in a fixed bed adsorbtion column or in a multi-stage mixer-settler.

EXAMPLE

An environmental sediment from Waukegan Harbor (Michigan) containing 82% water was separated by vacuum filtration into a liquid fraction and a wet solid fraction containing 57% water. The PCB concentration of the liquid fraction was determined using EPA-Method 608 and found to be 9 ppm. The wet solid fraction was analyzed by a soxhlet procedure disclosed at Analytical Chemistry, 1985, 57, 2452-2457. The PCB concentration in the solid fraction was 33100 ppm on a dry basis. The calculated partition coefficient was $K=3678$.

Using the wet solid fraction of Waukegan Harbor sediments and three different solvents: Acetone, Methanol and Isopropanol the leaching step was carried out. The sediment was contaminated with Aroclor 1242.

Amounts of 7.5 g of wet sediment and of 30 ml of solvent was filled in a 50 ml centrifuging tube and sealed off with a screw top. The specimens were agitated for one hour with a wrist action shaker and then centrifuged for 30 minutes at 3000 rpm. The supernate was decanted, vacuum filtrated through a 0.45 μm organic filter and replaced with new solvent. This procedure—which defines one stage—was repeated four times. The PCBs were then transferred to Methylenechloride by adding 200 ml of a 2% $Na_2SO_4$ aqueous solution to the 30 ml of leachate and performing three successive liquid-liquid extractions with 60 ml of Methylenechloride each. The combined extracts were then dried and cleaned up, following the procedures in method 608 of USEPA and analyzed by gaschromatography. The results are presented in table I.

TABLE I

| SOLVENT | STAGE # | PCB REMOVED/ UNIT MASS OF SOLID (ppm) | RUNNING TOT. OF PCB REMOVED/ UNIT MASS OF SOLID (ppm) | OVERALL LEACHING EFFICIENCY (%) | STAGE EFFICIENCY (%) | PCB-CONC. IN SOLID AFTER N-th STAGE, ASSUMING ALL PCB ASSOC. WITH SOLID (ppm) |
|---|---|---|---|---|---|---|
| METHANOL | 0 th | 0 | 0 | | | 32508 |
| | 1 st | 26085 | 26085 | 80.24 | 80.2 | 6424 |

TABLE I-continued

| SOLVENT | STAGE # | PCB REMOVED/ UNIT MASS OF SOLID (ppm) | RUNNING TOT. OF PCB REMOVED/ UNIT MASS OF SOLID (ppm) | OVERALL LEACHING EFFICIENCY (%) | STAGE EFFI- CIENCY (%) | PCB-CONC. IN SOLID AFTER N-th STAGE, ASSUMING ALL PCB ASSOC. WITH SOLID (ppm) |
|---|---|---|---|---|---|---|
|  | 2 nd | 5429 | 31514 | 96.94 | 84.5 | 995 |
|  | 3 rd | 863 | 32376 | 99.59 | 86.7 | 132 |
|  | 4 th | 114 | 32490 | 99.94 | 86.2 | 18 |
|  | *5 th | 16 | 32506 | 99.99 | 87.1 | 2 |
|  | *6 th | 2 | 32508 | 100.00 |  | 0 |
| ISOPROPANOL | 0 th | 0 | 0 |  |  | 32914 |
|  | 1 st | 27537 | 27537 | 83.66 | 83.7 | 5378 |
|  | 2 nd | 4250 | 31787 | 96.57 | 79.0 | 1128 |
|  | 3 rd | 844 | 32630 | 99.14 | 74.8 | 284 |
|  | 4 th | 213 | 32843 | 99.78 | 74.9 | 71 |
|  | *5 th | 56 | 32900 | 99.96 | 79.0 | 15 |
|  | *6 th | 15 | 32914 | 100.00 |  | 0 |
| ACETONE | 0 th | 0 | 0 |  |  | 33641 |
|  | 1 st | 27656 | 27656 | 82.21 | 82.2 | 5986 |
|  | 2 nd | 5376 | 33032 | 98.19 | 89.8 | 610 |
|  | 3 rd | 527 | 33559 | 99.75 | 86.4 | 83 |
|  | 4 th | 71 | 33630 | 99.97 | 86.1 | 11 |
|  | *5 th | 10 | 33640 | 100.00 | 84.6 | 1 |
|  | *6 th | 1 | 33641 | 100.00 |  | 0 |

*THE VALUES FOR THE 5 th AND 6 th STAGE ARE EXTRAPOLATED VALUES FROM STAGES 1 THROUGH 4.

The same procedure was performed with a sediment obtained from Franklin Institute. The contaminant was Aroclor 1260, the solvent used was methanol and the agitation times were six and 24 hours respectively. The results are given in Table II.

| AGITATION TIME (hrs) | STAGE # | PCB REMOVED IN THE 1 st, 2 nd, ... Nth, STAGE PER UNIT MASS OF SOLID (ppm) | TOTAL PCB REMOVED AFTER NO OF STAGES PER UNIT MASS OF SOLID (ppm) | OVERALL LEACHING EFFICIENCY (%) | STAGE EFFICIENCY (%) | PCB-CONC IN SOLID AFTER N-TH STAGE, ASSUMING ALL PCB ASSOC. WITH SOLID (ppm) |
|---|---|---|---|---|---|---|
| 24 | 0 th |  |  |  |  | 876 |
|  | 1 st | 788.0 | 788.0 | 89.91 | 89.9 | 88 |
|  | 2 nd | 80.7 | 868.7 | 99.12 | 91.3 | 8 |
|  | 3 rd | 7.1 | 875.8 | 99.92 | 91.4 | 1 |
|  | 4 th* | 0.6 | 876.4 | 99.99 | 90.0 | 0.1 |
|  | 5 th* | 0.1 | 876.5 | 100.00 |  | 0.0 |
| 6 | 0 th |  |  |  |  | 935 |
|  | 1 st | 816.0 | 816.0 | 87.32 | 87.3 | 119 |
|  | 2 nd | 101.6 | 917.6 | 98.19 | 85.7 | 17 |
|  | 3 rd | 14.9 | 932.5 | 99.78 | 87.8 | 2 |
|  | 4 th* | 1.8 | 934.3 | 99.98 | 89.0 | 0.2 |
|  | 5 th* | 0.2 | 934.5 | 100.00 |  | 0.0 |

*THE VALUES FOR THE 4 th AND 5 th STAGE ARE EXTRAPOLATED FROM STAGES 1 THROUGH 3.

In order to carry out the step of stripping, acetone was spiked with PCBs (Aroclor 1242) to a concentration of 44 μg/ml. Aliquotes of this stock solution were mixed with various amounts of kerosene and aqueous $K_2SO_4$ solution. The independent variables were the ratio of water to acetone ($R_A$), the ratio of acetone to kerosene ($R_B$) and the concentration (in mass %) of $K_2SO_4$ in the water-acetone mixture. The dependent variable was the transfer efficiency. ($\eta$). The liquids were filled into a glass bottle, which was sealed with a teflon lined screw top, and then agitated for one hour. After allowing 30 minutes for phase separation the kerosene was siphoned off and its PCB-conc. analyzed by gas chromatography. The results in table III show that stage efficiencies of higher than 80% can be achieved.

TABLE III

| Ratio of water to acetone $R_A$ | Ratio of acetone to kerosene $R_B$ | $K_2SO_4$ in water-acetone (mass %) | Transfer efficiency (%) |
|---|---|---|---|
| 3.5 | 4 | 0.2 | 83 |
| 3.5 | 4 | 1.2 | 82 |
| 5 | 4 | 0.2 | 81 |
| 5 | 4 | 1.2 | 83 |

The liquid fraction of the original sediment contains small amounts of PCBs. They are removed by adsorbing them onto a small quantity of the cleaned solid fraction of the sediment.

The step of adsorbtion was carried out by providing two samples of 150 ml of the liquid fraction, containing 9 ppm of Aroclor 1242. The samples were each mixed with 8.5 g of the PCB-free solid fraction of Waukegan Harbor sediments. The mixture was agitated for 10 minutes. After complete settling of the solids the liquid fraction was decanted and vacuum filtrated with a 0.45 μm filter and analyzed for PCBs using method 608 of USEPA and gaschromatography. The PCB concentration was below detection limit in both samples.

What is claimed is:

1. A process for the decontamination of materials including solids contaminated with organic contaminants, the process comprising the steps of:
   (a) separating the material into a solid fraction;
   (b) leaching the solid fraction with a liquid consisting essentially of a hydrophilic leaching solvent and up to 30% water to obtain contaminated leaching solvent and a mixture of decontaminated solid fraction and leaching solvent, and wherein the hydrophilic solvent is completely miscible in water and has a boiling point in the range of 40° C. to 95° C. at atmospheric pressure; and
   (c) stripping contaminants from the contaminated leaching solvent with a hydrophobic stripping solvent and water to concentrate the contaminants, and wherein the hydrophobic solvent has a density of less than 0.9 g/ml, and the hydrophobic solvent is such that a partition coefficient of the contaminants between the hydrophobic and the hydrophilic solvent is equal to or greater than 3 for the entire range of the ratio of water to hydrophilic solvent.

2. The process according to claim 1, further comprising:
   (d) stripping the leaching solvent from the mixture produced in step (b) to produce decontaminated solid fraction; and
   (e) recycling leaching solvent from the stripped leaching solvent of step (d) and step (c) into the leaching step (b).

3. The process according to claim 1, further comprising:
   (f) separating the contaminants from the contaminated stripping solvent of step (c) to produce decontaminated stripping solvent; and
   (g) recycling the decontaminated stripping solvent of step (f) to the stripping step (c).

4. The process according to claim 1, wherein the step (b) of leaching comprises multistage countercurrent leaching.

5. The process according to claim 1, wherein the hydrophilic solvent comprises a solvent selected from the group consisting of acetone, methanol, ethanol, and isopropanol.

6. The process according to claim 5, wherein the hydrophobic solvent includes one selected from the group consisting of the methane series with 6 to 16 carbon atoms per molecule, kerosene and toluene.

7. The process according to claim 1, wherein the step (c) of stripping comprises contacting the contaminated leaching solvent in a liquid-liquid extractor with the stripping solvent and an aqueous solution of potassium sulfate.

8. The process according to claim 1, wherein step (a) comprises separating the material into a solid fraction and a liquid fraction with residual contaminant and further comprising:
   (h) adsorbing residual contaminant from the liquid fraction from step (a) onto decontaminated solid fraction to produce decontaminated liquid fraction and contaminated solid fraction.

9. The process according to claim 8, comprising: adding the contaminated solid fraction from step (h) to the solid fraction to be leached in step (b).

10. The process according to claim 8, further comprising: using a portion of the decontaminated solid fraction from step (b) to constitute the decontaminated solid fraction in step (h).

11. The process according to claim 8, wherein the step (a) of separating comprises physically separating the liquid and solid fractions.

12. The process according to claim 11, wherein the step of physically separating comprises one of filtering and/or centrifuging.

13. A process for the decontamination of a mixture of sediment and water containing a contaminant including organic PCBs, the process comprising the steps of:
   (a) separating the mixture into a solid fraction including water and a liquid fraction including residual contaminant;
   (b) leaching the solid fraction with a liquid consisting essentially of a hydrophilic solvent and up to 30% water to obtain a contaminated mixture of solvent and water and a decontaminated mixture of sediment, solvent and water, and wherein the hydrophilic solvent is completely miscible in water and has a boiling point in the range of 40° C. to 95° C. at atmospheric pressure;
   (c) stripping contaminant from the contaminated mixture of step (b) with a hydrophobic solvent and water to produce contaminated hydrophobic solvent in which the contaminant is concentrated and a decontaminated mixture of hydrophilic solvent and water, and wherein the hydrophobic solvent has a density of less than 0.9 g l/ml, and the hydrophobic solvent is such that a partition cofficient of the contaminant between the hydrophobic and the hydrophhilic solvent is equal to or greater than 3 for the entire range of the ratio of water to hydrophilic solvent; and
   (d) adsorbing the residual contaminant from the liquid fraction onto decontaminated sediment to produce decontaminated water and contaminated sediment.

14. The process according to claim 13, further comprising:
   (a) stripping the hydrophilic solvent and water from the decontaminated mixture produced in step (b) to produce decontaminated sediment;
   (f) separating hydrophilic solvent from water in the stripped hydrophilic solvent and water of step (e) and step (c); and
   (g) recycling the separated hydrophilic solvent from step (f) into the leaching step (b).

15. The process according to claim 7, further comprising:
   (h) adding the contaminated sediment from step (d) to the solid fraction to be leached in step (b);
   (i) using a portion of the decontaminated sediment from step (b) to constitute the decontaminated sediment in step (d); and
   (j) using the water obtained in step (f) for the water in step (c).

16. The process according to claim 15, further comprising:
   (k) separating the contaminant from the contaminated hydrophobic solvent of step (c) to produce decontaminated hydrophobic solvent; and
   (i) recycling the decontaminated hydrophobic solvent of step (k) to the stripping step (c).

17. The process according to claim 16, wherein the step (a) of separating comprises physically separating the liquid and solid fraction.

18. The process according to claim 17, wherein the step of physically separating comprises one of filtering and centrifuging.

19. The process according to claim 13, wherein the step (b) of leaching comprises multistage countercurrent leaching.

20. The process according to claim 19, wherein the hydrophilic solvent comprises one selected from the group consisting of acetone, methyl ethyl ketone, methanol, ethyl alcohol, isopropanol.

21. The process according to claim 20, wherein the hydrophobic solvent comprises one selected from the group consisting of the methane series with 6 to 16 carbon atoms per molecule, kerosene and toluene.

22. The process according to claim 13, wherein the step (c) of stripping comprises contacting the contaminated hydrophilic solvent in a liquid-liquid extractor with the hydrophobic solvent, and water or an aqueous solution of a mineral salt.

* * * * *

UNITED STATES PATENT AND TRADEMARK OFFICE
CERTIFICATE OF CORRECTION

PATENT NO. : 4,801,384

DATED : January 31, 1989

INVENTOR(S) : Werner Steiner

It is certified that error appears in the above-identified patent and that said Letters Patent is hereby corrected as shown below:

| | |
|---|---|
| Title Page, Title, line 3 and Col. 1, Title, line 3 | Delete "SEDIMENTA" and substitute --SEDIMENT-- |
| Col. 6, line 15 | Delete "multiphase" and substitute --multistage-- |
| Col. 7, line 51 | Delete "44" and substitute --444-- |
| Col. 10, line 39 | Delete "(a)" and substitute --(e)-- |
| Col. 10, line 31 | Correct --hydrophilic-- |
| Col. 10, line 47 | Delete "claim 7" and substitute --claim 14-- |
| Col. 10, line 61 | Delete "(i)" and substitute --(1)-- |

Signed and Sealed this

Nineteenth Day of November, 1991

Attest:

HARRY F. MANBECK, JR.

*Attesting Officer*  *Commissioner of Patents and Trademarks*